April 7, 1964 P. PROFOS 3,127,877
ONCE-THROUGH BOILER AND METHOD OF OPERATING THE BOILER
Filed July 15, 1960 2 Sheets-Sheet 1
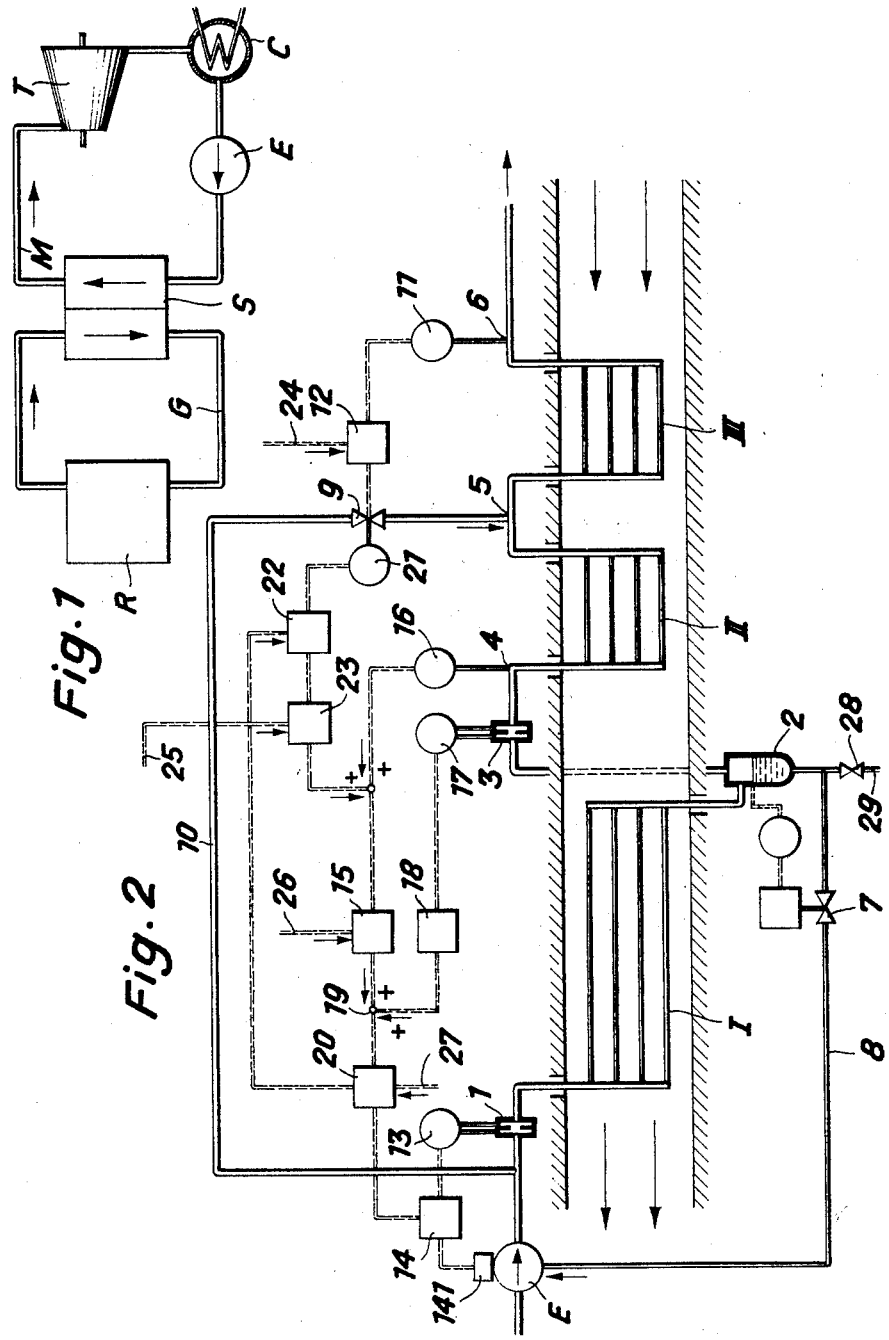

United States Patent Office 3,127,877
Patented Apr. 7, 1964

3,127,877
ONCE-THROUGH BOILER AND METHOD
OF OPERATING THE BOILER
Paul Profos, Winterthur, Switzerland, assignor to Sulzer Freres, S.A., Winterthur, Switzerland, a corporation of Switzerland
Filed July 15, 1960, Ser. No. 43,124
Claims priority, application Switzerland July 17, 1959
5 Claims. (Cl. 122—406)

The present invention relates to a method of operating a heat exchange system and to an apparatus for performing the method wherein heat is exchanged between two fluids which flow in countercurrent fashion whereby the heating fluid enters the system at substantially constant temperature and its velocity is changed according to the amount of heat required by the heat exchanger so that the outlet temperature of the heating fluid is also substantially constant. The fluid to be heated is of a kind which is vaporized and superheated by the heat absorbed from the first fluid. The superheated vapor is used for operating a steam turbine or the like for producing mechanical power.

Heat transfer systems as described above are used, for example, in power plants deriving their heat from a nuclear reactor. The heating fluid is usually in the gas state and acts as coolant for the reactor. The temperatures of this gaseous fluid at the inlet and at the outlet of the heat transfer system are maintained constant by conventional control apparatus. These temperatures are so low that there is no appreciable heat radiation and almost all heat is transferred in the transfer system by convection. For changing the amount of heat transferred in the system to comply with changing load requirements of the power plant, the velocity of the reactor coolant circulating through the reactor and through the heat transfer system is changed. If the load is reduced and less vapor or steam is demanded, the velocity of the flow of the second fluid, i.e. the operating medium of the power plant, through the heat transfer system is also reduced. For this reason, depending on the amount of heat transferred, the point where the operating medium is completely vaporized moves within the heat transfer system. If the two fluids move countercurrent, this point moves downstream with respect to the direction of flow of the second fluid when the load is reduced. At low loads, unstable flow conditions will prevail in the evaporating portion of the heat transfer system, i.e. in the portion in which the operating medium is predominantly in the liquid state slugs of liquid will alternate with bubbles of vapor. These unstable flow conditions cause local superheating, resulting in damage to the tubes of the system.

It is an object of the present invention to provide a method and apparatus whereby the flow in the evaporating section of a system for transferring heat from a first fluid to a second fluid, which flows in counterflow relation to the first fluid and whose inlet and outlet temperatures are maintained substantially constant at varying outputs of the heated second fluid, is stabilized at all output conditions, i.e. whereby alternate passage of slugs of liquid and bubbles of vapor through the evaporating section, causing unstable flow conditions in said section, is avoided.

In forced flow steam generators, water separators are usually provided at the end of the evaporating zone. These separators are in operation at all loads and continuously blow down a portion of the operating medium. This operation is wasteful.

In order to avoid this waste and in order to obtain the aforestated object of the invention, in the system according to the invention an amount of liquid operating medium is introduced into the evaporating section of the system when the system is operated below a predetermined partial load which amount is greater than the amount of vapor or steam withdrawn from the system at this load and the excess operating medium is separated as a liquid at an intermediate point of the system and returned to the operating medium entering the system. When operating above the predetermined partial load, the amount of liquid operating medium introduced into the system is equal to the amount of vapor or steam withdrawn from the system. In this case the liquid is fully evaporated in the evaporating section and the water separator is dry.

The novel features which are considered characteristic of the invention are set forth with particularity in the appended claims. The invention itself, however, and additional objects and advantages thereof will best be understood from the following description of an embodiment thereof when read in connection with the accompanying drawing wherein:

FIG. 1 is a diagram showing the coolant circuit and the circuit of the operating medium in a nuclear power plant.

FIG. 2 is a diagrammatic illustration of a heat transfer system forming part of the plant shown in FIG. 1.

Figure 3:
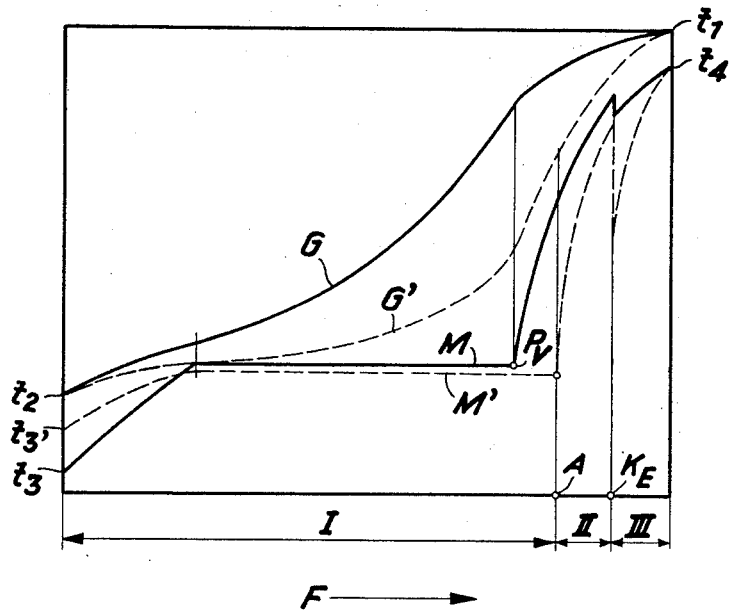
FIG. 3 is a diagram showing the temperatures of the coolant and of the operating fluid as they flow along the heat transfer surface of the heat transfer system shown in FIG. 2.

Referring more particularly to FIG. 1, the heat generated in a nuclear reactor R is transferred in a heat exchanger S from a coolant for the nuclear reactor to an operating medium which drives a turbine T. The coolant, which is usually a gas, flows in a circuit G in the direction of the arrows. This first fluid absorbs heat in the nuclear reactor R and carries the heat into the heat exchanger S surrendering a portion of the heat to an operating medium flowing in the circuit M, whereupon the first fluid is returned to the nuclear reactor R to be heated once more. The operating medium, which is the second fluid in the system, is a substance, for example water, which is vaporized and superheated in the heat transfer system. The operating medium leaves the heat exchanger S and enters the turbine T as superheated steam which is expanded in the turbine so that in most cases wet steam is exhausted from the turbine and condensed in a condenser C. The condensate is returned by means of a pump E to the heat exchanger S.

FIG. 2 is a detailed illustration of the heat exchange system S forming part of the system shown in FIG. 1. Liquid operating medium, for example water, is introduced by means of a feed pump E through an orifice 1 into a heat exchanger portion I where a major portion of the liquid is vaporized. The operating medium leaving the heat exchanger portion I is passed through a liquid separator 2. The steam or vapor separated therein flows through an orifice 3 and through a temperature sensing device 4 to a second heat exchanger part II and therefrom to a third heat exchanger part III. A controlled amount of liquid operating medium is injected at 5 from a pipe 10 into the steam flowing from the part II to the part III. The superheated live steam leaving the heat exchanger portion III passes a temperature sensing device 6 and is conducted into the turbine T, not shown in FIG. 2.

The three heat exchanger parts I, II and III include tube packages through which the second fluid, the operating medium for the power plant, is conducted. The first fluid, which is the reactor coolant, flows outside of the tubes and, at least in part, countercurrent to the second fluid. The first fluid consecutively passes over the tubes of the part III, of the part II, and finally of the part I, whereas the second fluid flows first through the tubes of the part I, then through the tubes of the part II, and finally through the tubes of the part III. Within the individual heat exchanger parts, the two heat exchanging fluids need not flow countercurrent but may, at least in part, flow crosscurrent.

The liquid discharge side of the liquid separator 2 is connected by means of a pipe 8 containing a valve 7 to the inlet of the feed pump E. A pipe 10 containing a control valve 9 connects the injecting device 5 to the outlet of the pump E.

A conventional device 11 is operatively connected to and produces signals corresponding to the final steam temperature sensed by the device 6. These signals are transferred to a proportional plus reset controller 12 of conventional design. The latter actuates the valve 9 controlling the amount of fluid injected into the operating medium at 5.

The amount of feedwater supplied to the system is controlled by a control loop including the orifice 1, a conventional device 13 responsive to the rate of flow of the operating medium through the orifice 1, a conventional proportional plus reset controller 14 and a device 141 for adjusting the speed of the pump E. For adjusting the set point of the feedwater control loop, a signal produced by a proportional plus reset controller 15 is transferred to the proportional plus reset controller 14. The controller 15 is responsive to a signal produced by a device 16 which is responsive to the temperature of the operating medium sensed by the device 4. A conventional device 17 produces a signal which corresponds to the rate of flow of operating medium through the orifice 3. This signal passes through a conventional proportional position action controller 18 and is added in a conventional adding device 19 to the signal produced by the controller 15. The combined signal which is responsive to the temperature of the operating medium at 4 as well as to the rate of flow of the operating medium at 3 is conducted through a conventional limiting device 20 into the controller 14. The limiting device 20 limits reduction of feedwater supply so that this supply is not further reduced when the load drops below half load. The injection control valve 9 actuates a conventional device 21 which produces a signal corresponding to the opening of the valve 9 which signal is transferred through a conventional interrupting device 22 to a conventional integrating element 23 which is connected by a signal conduit to the controller 15. The purpose of the elements 21 and 23 is to slowly correct the temperature at the point 4 in cooperation with the controller 15 so that the opening of the injection control valve 9 and the amount of fluid injected at 5 assume a predetermined average. The interrupting element 22 is connected to the limiting device 20 and interrupts the connection between the elements 21 and 23 whenever the limiting device 20 comes into action.

The conduits 24, 25, 26 and 27 serve for transmitting signals to the controllers 12, 23, 15 and 20, respectively, which signals correspond to the load on the turbine T and which serve for adjusting the set points of these controllers in response to the load.

A blowdown pipe 29 is connected to the separator 2, a valve 28 being interposed in the blowdown pipe. The blown down liquid may be tested to discover the presence of matter which cannot be vaporized or to discover radioactivity, in which case the blowdown liquid would be removed from the circuit or, after purification, be returned to the circuit.

FIG. 3 is a diagram in which the temperatures are plotted which prevail in the heat exchange system according to FIG. 2 along a heat transfer surface F which is formed by the heat exchanger parts I, II and III. The lines G, G' indicate the temperature of the reactor coolant and the lines M, M' show the temperature of the operating medium to which heat is transferred from the coolant. The solid lines G and M indicate the temperatures when the system is operating at full load. The dotted lines G' and M' indicate the temperatures when the system operates at half load. The reactor coolant enters the heat transfer system at a substantially constant inlet temperature $t_1$ and is cooled down to a substantially constant outlet temperature $t_2$. At full load, the operating medium or second fluid enters the heat exchanger part I as a liquid at the temperature $t_3$ and is heated to evaporation temperature, vaporized and partly superheated in said part I. The superheating process is continued in the parts II and III of the heat exchanger. The outlet temperature $t_4$ of the opearting medium leaving the part III is maintained constant by injecting liquid into the operating medium while it passes from part II to part III (point $K_E$ in FIG. 3). At full load, the entire amount of operating medium introduced into the part I is vaporized upstream of the point $P_V$ which is upstream of the separator 2 (position A in FIG. 3). There is, therefore, no liquid separated in the separator 2. The amount of liquid fed into the part I substantially corresponds to the produced amount of vapor or steam and is so great that the flow in part I is stable.

When the system operates at partial load, there is a possibility that the flow in the part I of the heat transfer system is unstable. This is particularly the case at loads below 50% of full load. Because of the provision of the limiting controller 20, more liquid operating medium is fed into the part I than vapor or steam is withdrawn from part III. The excess operating medium is not evaporated in the heat exchanger part I and flows as a liquid through the separator 2 and is conducted therefrom to the inlet of the feed pump E. For this reason, the inlet temperature $t_3$, of the operating medium is higher at partial load than at full load. The vapor or steam separated in the separator 2 is superheated in the parts II and III and leaves the latter at substantially constant temperature $t_4$. The outlet pressure of the operating medium is maintained constant by conventional means. Due to the smaller pressure drop in the system at partial load, the inlet pressure produced by the feed pump is also lower and the evaporation temperature is, consequently, also lower at partial load as shown by the dotted line M'.

Figure 4:
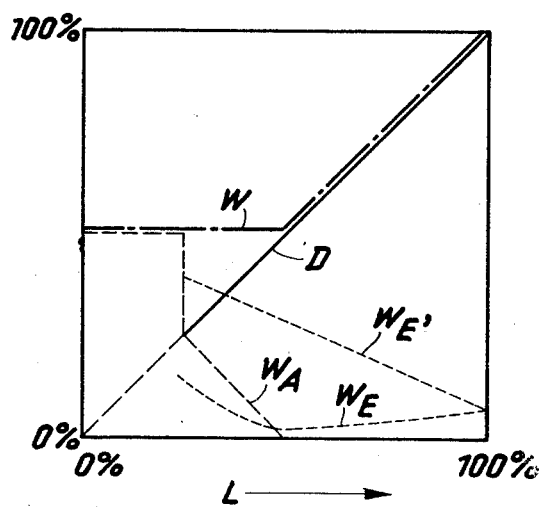
FIG. 4 is a diagram showing the circulating amounts of liquid and vapor or steam forming the operating medium in a system according to FIG. 2.

The diagram FIG. 4 illustrates the rate of flow of the heat exchange fluids in the system shown in FIG. 2 at various loads or outputs L. The amount of vapor or steam taken from the heat transfer system is proportional to the load and is indicated by a solid line D which begins at about 25% of full load. The amount of liquid introduced into the heat transfer system is shown by a dash-dot line W and, when operating between half load and full load, corresponds to the amount of steam leaving the system. When the load drops below 50%, the liquid fed into the system is not reduced but corresponds to the amount defined by the limiting device 20 which amount need not be constant, although, for the sake of simplicity, a horizontal dash-dot line W is shown in FIG. 4 between zero and half load. The dotted line $W_A$ in FIG. 4 indicates the amount of operating medium separated in the separator 2. When the plant is started and operates below 25% throughput, all of the second fluid introduced into the part I as a liquid is returned to the pump E as a liquid and recirculated. When the load is increased from 25% to 50%, the liquid separated in the separator 2 is greatly reduced and is zero at half load when all operating medium fed into the part I is vaporized therein before reaching the separator 2.

The dotted line $W_E$ in FIG. 4 represents the amount of water injected at 5 into the system. If the separator 2 would not be placed at a point of the system where at full load the entire operating medium is vaporized and already somewhat superheated, but would be placed, for example, at the full load point $P_V$ in FIG. 3, i.e., where the operating medium reaches the state of dry vapor or steam and is not superheated as yet, the amount of water injected would be according to line $W_E$, in FIG. 4. The amount of injected liquid would be much greater in this case and would require a correspondingly expensive injection device. The main disadvantage, however, would be that the evaporating portion I of the heat transfer system would be still less thermally loaded and the possibility of unstable flow in part I would be increased which is contrary to the desired result.

The system according to the invention affords maintenance of the necessary flow stability in heat transfer systems also when they are operated at partial loads so that damage to the heat transfer surfaces due to local overheating is avoided.

By placing the point at which excess operating medium is removed from the system, at the prescribed locality the amount of liquid introduced into the superheated operating medium can be held at a minimum so that an optimal operating efficiency is obtained.

I claim:

1. A method of operating a heat exchanger for cooling the coolant fluid of a nuclear reactor, the heat exchanger having a tube system forming a once-through type forced flow vapor generator wherein a vaporizable operating medium is forced to flow at variable flow rates corresponding to variable loads in counterflow relation to the coolant issuing from the reactor consecutively through a first heat exchange section, a liquid separator and through a second heat exchange section, the method comprising:

maintaining a flow rate of the operating medium through the first heat exchange section at which flow rate the operating medium leaves said first heat exchange section in wet vapor state, and separating the liquid phase from the vapor phase in said separator and conducting the vapor phase into said second heat exchange section and diverting the liquid phase from said second heat exchange section, upon operation of the heat exchanger below a predetermined load;

maintaining a flow rate of the operating medium through the first heat exchange section at which flow rate the operating medium leaves said first heat exchange section in saturated vapor state and passing the entire effluent of said first heat exchange section into said second heat exchange section, upon operation of the heat exchanger at said predetermined load; and maintaining a flow rate of the operating medium through the first heat exchange section at which flow rate the operating medium leaves said first heat exchange section in superheated vapor state and passing the entire effluent of said first heat exchange section into said second heat exchange section, upon operation of the heat exchanger above said predetermined load.

2. A method of operating a heat exchanger for cooling the coolant fluid of a nuclear reactor, the heat exchanger having a tube system forming a once-through type forced flow vapor generator wherein a vaporizable operating medium is forced to flow at variable flow rates corresponding to variable loads in counterflow relation to the coolant issuing from the reactor consecutively through a first heat exchange section, a liquid separator and through a second heat exchange section, the method comprising:

maintaining a flow rate of the operating medium through the first heat exchange section at which flow rate the operating medium leaves said first heat exchange section in wet vapor state, and separating the liquid phase from the vapor phase in said separator and conducting the vapor phase into said second heat exchange section and diverting the liquid phase from said second heat exchange section, upon operation of the heat exchanger below a predetermined load;

maintaining a flow rate of the operating medium through the first heat exchange section at which flow rate the operating medium leaves said first heat exchange section in saturated vapor state and passing the entire effluent of said first heat exchange section into said second heat exchange section, upon operation of the heat exchanger at said predetermined load;

maintaining a flow rate of the operating medium through the first heat exchange section at which flow rate the operating medium leaves said first heat exchange section in superheated vapor state and passing the entire effluent of said first heat exchange section into said second heat exchange section, upon operation of the heat exchanger above said predetermined load; and injecting liquid operating medium into said second heat exhcange section for controlling the temperature of the operating medium therein.

3. A heat transfer system including:

duct means conducting an initially relatively hot first fluid, conduit means placed in said duct means and forming a forced flow vapor generator operating under variable load conditions, said conduit means conducting a relatively cool second fluid through said duct means in counterflow relation to the first fluid for transferring heat from said first fluid to said second fluid whereby the point where evaporation of said second fluid is completed travels upstream in said conduit means upon an increasing load and travels downstream in said conduit means upon decreasing load, means for feeding the second fluid in liquid state into said conduit means, a liquid separator interposed in said conduit means, and a pipe connected to said separator for receiving liquid therefrom and connected to said feeding means for returning second fluid in the liquid state to the fluid fed into said conduit means, said separator being connected to said conduit means at a point where said second fluid is in wet vapor state when the vapor generator is operated below a predetermined load, where the second fluid is in dry, saturated vapor state when the vapor generator is operated at said predetermined load, and where said second fluid is in the state of superheated vapor when the vapor generator is operated above said predetermined load; whereby said separator is dry, when the vapor generator is operated at and above the predetermined load.

4. A heat transfer system including:

duct means conducting an initially relatively hot first fluid, conduit means placed in said duct means and forming a forced flow vapor generator operating under variable load conditions, said conduit means conducting a relatively cool second fluid through said duct means in counterflow relation to the first fluid for transferring heat from said first fluid to said second fluid whereby the point where evaporation of said second fluid is completed travels upstream in said conduit means upon an increasing load and travels downstream in said conduit means upon decreasing load, means for feeding the second fluid in liquid state into said conduit means, a liquid separator interposed in said conduit means, a pipe connected to said separator for receiving liquid therefrom and connected to said feeding means for returning second fluid in the liquid state to the fluid fed into said conduit means, said separator being connected to said conduit means at a point where said second fluid is in wet vapor state when the vapor generator is operated below a predetermined load, where the second fluid is in dry, saturated vapor state when the vapor generator is operated at said predetermined load, and where said second fluid is in the state of superheated vapor when the vapor generator is operated above said predetermined load; whereby said separator is dry, when the vapor generator is operated at and above the predetermined load, and injection means connected to said conduit means downstream of said separator for injecting liquid second fluid into said conduit means for controlling the temperature of the second fluid flowing in said conduit means downstream of said separator.

5. The method defined in claim 1 wherein said predetermined load is at least 40% to 60% of the maximum load.

References Cited in the file of this patent

UNITED STATES PATENTS

| 2,170,347 | Dickey | Aug. 22, 1939 |
| 3,038,453 | Armacost | June 12, 1962 |

FOREIGN PATENTS

| 382,731 | Great Britain | Nov. 3, 1932 |
| 770,091 | Great Britain | Mar. 13, 1957 |